United States Patent

Sugawara

Patent Number: 5,828,667
Date of Patent: Oct. 27, 1998

[54] CELL SELECTION APPARATUS

[75] Inventor: Tsugio Sugawara, Tokyo, Japan

[73] Assignee: NEC Corporation, Tokyo, Japan

[21] Appl. No.: 645,016

[22] Filed: May 9, 1996

[30] Foreign Application Priority Data

May 11, 1995 [JP] Japan ................................. 7-112754

[51] Int. Cl.$^6$ ............................................. H04L 12/56
[52] U.S. Cl. .......................................... 370/392; 370/399
[58] Field of Search .................................. 370/389, 392, 370/393, 394, 395, 398, 399, 422, 426, 522, 905

[56] References Cited

U.S. PATENT DOCUMENTS

| | | | |
|---|---|---|---|
| 5,339,318 | 8/1994 | Tanaka et al. | 370/399 |
| 5,394,397 | 2/1995 | Yanagi et al. | 370/390 |
| 5,494,478 | 2/1996 | Wilkinson et al. | 370/399 |
| 5,627,836 | 5/1997 | Conoscenti et al. | 370/397 |
| 5,666,361 | 9/1997 | Aznar et al. | 370/398 |

Primary Examiner—Alpus H. Hsu
Attorney, Agent, or Firm—Foley & Lardner

[57] ABSTRACT

A cell selection apparatus includes processing circuits, conversion tables, a selector output reference table, conversion circuits, a discrimination section, a selection section, a registration section, and selector circuits. Each processing circuit performs a predetermined process for each cell. Each conversion table stores cell identifiers and process identifiers. The selector output reference table stores circuit identifiers and discrimination information indicating whether each circuit identifier is valid. Each conversion circuit reads out a cell identifier and a process identifier from the conversion table. The discrimination section discriminates whether a circuit identifier corresponding to the readout cell identifier is valid. The selection section selects one processing circuit corresponding to a process type indicated by the readout process identifier. The registration section registers discrimination information indicating that the circuit identifier indicating the selected processing circuit is valid. Each selector circuit inputs a cell to the selected processing circuit, and also inputs a cell to the processing circuit indicated by the circuit identifier discriminated as a valid identifier.

9 Claims, 4 Drawing Sheets

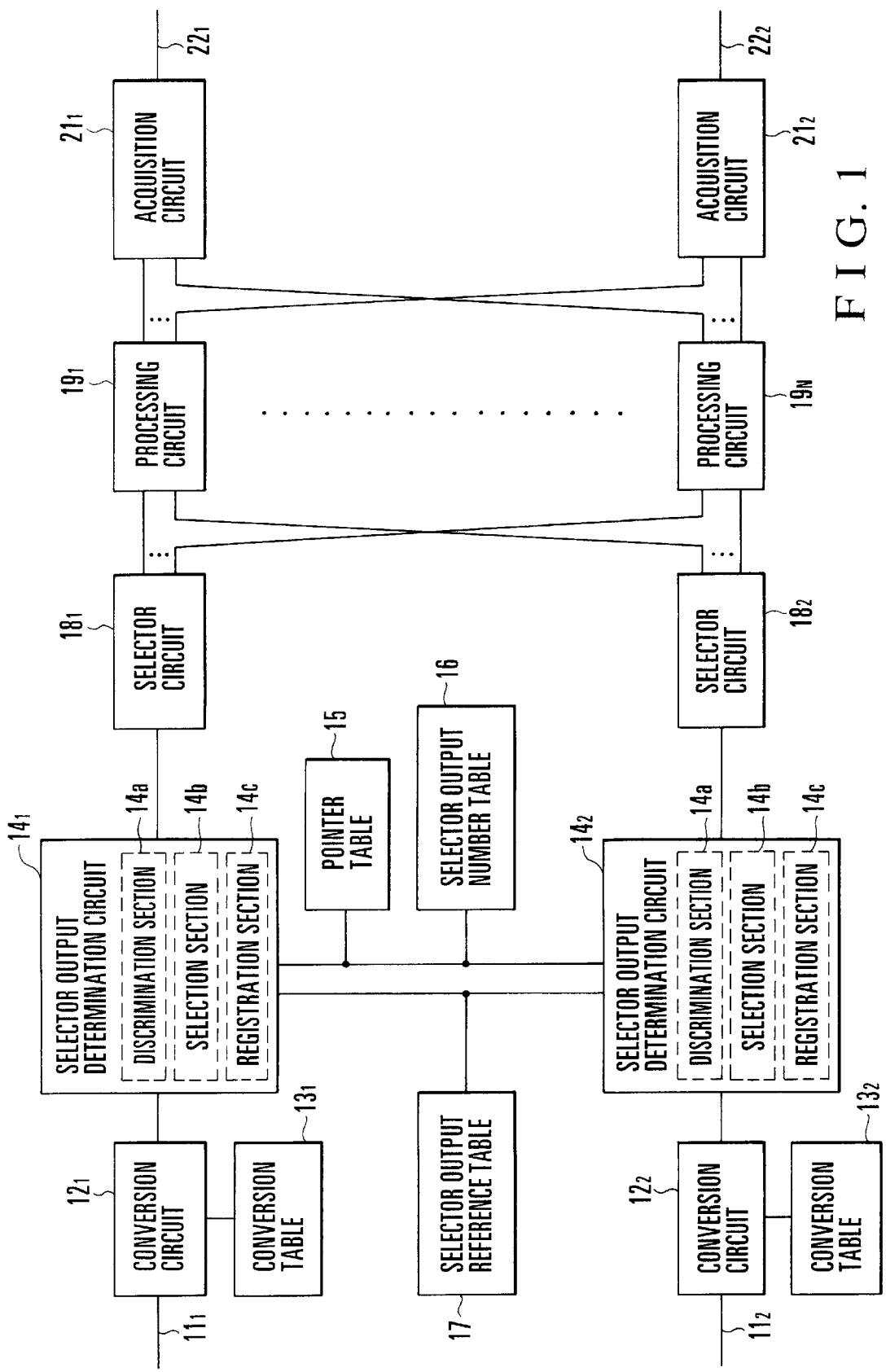
F I G. 1

CONVERSION TABLE 13₁, 13₂

| CELL IDENTIFIER | PROCESS IDENTIFIER |
|---|---|
| S1 | P1 |
| S3 | P3 |
| S1 | P1 |
| S2 | P2 |
| S3 | P3 |
|  |  |
| S1 | P1 |

31 = CELL IDENTIFIER column, 32 = PROCESS IDENTIFIER column, 33 = row range indicator

F I G. 2

SELECTOR OUTPUT REFERENCE TABLE 17

| SELECTOR OUTPUT NUMBER | VALIDITY BIT |
|---|---|
| 1 | 1 |
| 5 | 0 |
| 6 | 1 |
|  |  |

41 = SELECTOR OUTPUT NUMBER column, 42 = VALIDITY BIT column, 43 = row range indicator

F I G. 3

SELECTOR OUTPUT NUMBER TABLE 16

| SELECTOR OUTPUT NUMBER |
|---|
| 1 |
| 2 |
| 3 |
| 1 |
| 3 |
| 1 |
| 4 |
| 5 |
| 4 |
| 4 |
| 6 |
| ... |
| N |

F I G. 4

POINTER TABLE 15

| POINTER | MAXIMUM VALUE | OFFSET |
|---|---|---|
| 3 | 6 | 0 |
| 0 | 4 | 6 |
| 0 | 8 | 10 |
| | | |
| | | |

F I G. 5

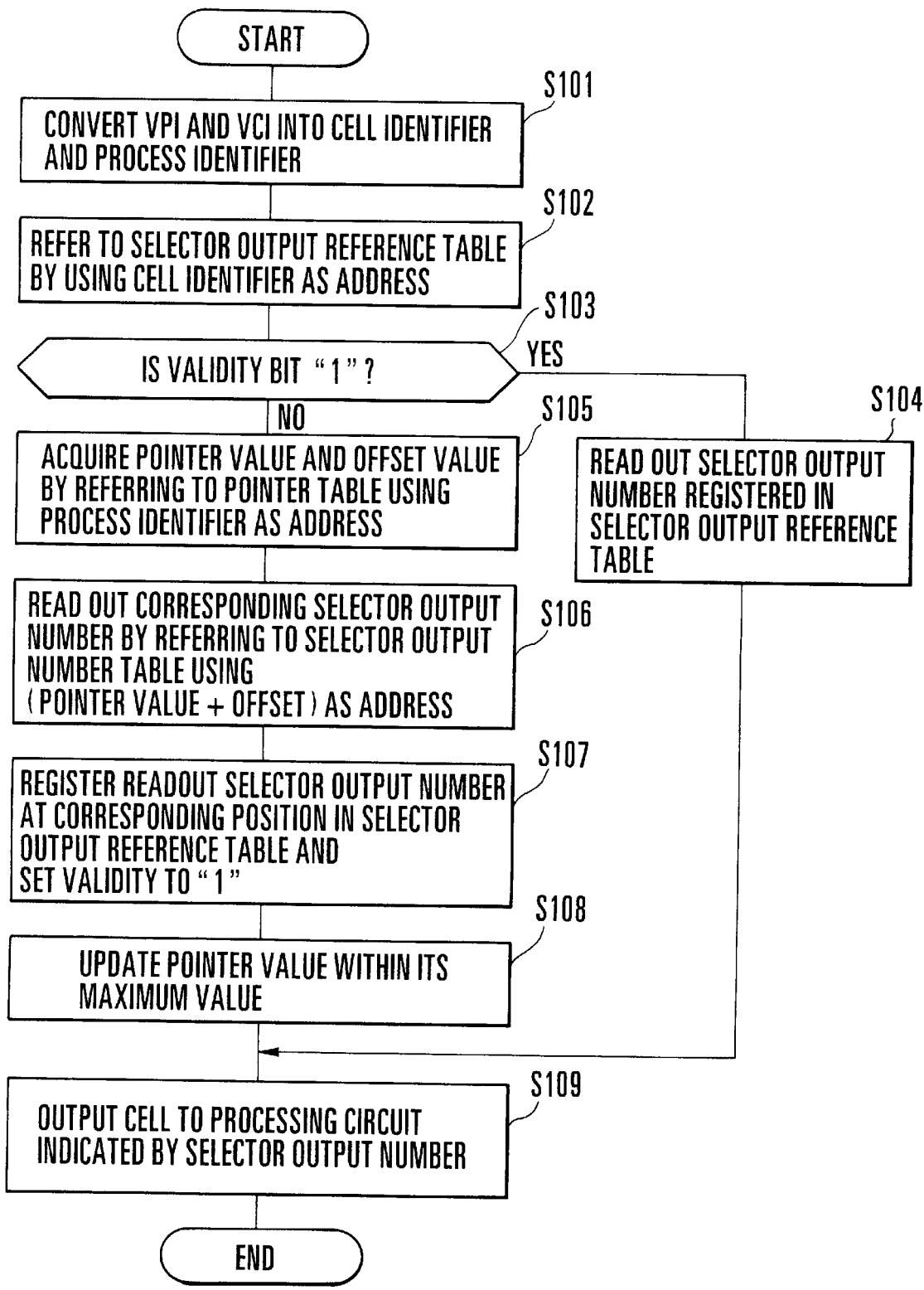
F I G. 6 ized data, and asynchronous transfer is performed in units of cells and, more particularly, to a cell selection apparatus for allocating processing circuits to cells input through a plurality of lines.

CELL SELECTION APPARATUS

BACKGROUND OF THE INVENTION

The present invention relates to a cell selection circuit for allocating processing circuits for performing various types of processes to cells which are being transferred in an ATM (Asynchronous Transfer Mode) communication system in which data to be transferred is divided into cells each having a predetermined amount of data, and asynchronous transfer is performed in units of cells and, more particularly, to a cell selection apparatus for allocating processing circuits to cells input through a plurality of lines.

The ATM is a communication mode in which data to be transferred is divided into packets called cells each having a predetermined amount of data, and the data is asynchronously transferred in units of packets. Each cell consists of 53 bytes. Of these bytes, 5 bytes constitute a header portion assigned to control information for the cell, and the remaining 48 bytes constitute an information field for storing information to be transferred. The header portion stores a virtual path identifier (VPI) for indicating the transfer source or destination of the cell and a virtual channel identifier (VCI). A repeater in the network determines the transfer route of the cell on the basis of these identifiers.

The repeater in the network sometimes performs some processes for a transferred cell. For example, when a plurality of users are to hold a telephone conference using the ATM communication system, a process of eliminating crosstalk and a speech compression process are sometimes performed for cells transferred between the users. The repeater has various processing circuits for such processes, and allocates a processing circuit to each cell. A circuit for allocating processing circuits to transferred cells will be called a cell selection circuit. The cell selection circuit is designed to select a processing circuit to be allocated in accordance with a value represented by a predetermined number of bits of VPI/VCI data. In addition, in order to perform the same process for cells from a plurality of users in a telephone conference, the same processing circuit is allocated to the cells from the users.

When a plurality of lines are connected to the repeater, each processing circuit is commonly provided for these lines. The purpose of this arrangement is to use the same processing circuit to process cells from users connected to different lines in a telephone conference or the like in which speech communication is performed between a plurality of users. In order to allocate the same processing circuit to cells from a plurality of users associated with each other in a telephone conference or the like, cells from specific users are always allocated to specific processing circuits in the repeater. For example, the relationship between selection routes for input cells and processing circuits is determined in advance such that cells from users I and II connected to a line A and a user III connected to a line B are allocated to a circuit a, and cells from users IV and V respectively connected to the lines A and B are allocated to a circuit b.

As described above, in the conventional cell selection circuit, the correspondence between selection routes for input cells from lines and processing circuits is fixed in advance. If, therefore, there are many processing circuits and many users, a complicated setting operation is required. In addition, since a specific processing circuit is fixed for specific users, concentration of processes on the specific processing circuit may occur. Furthermore, since the relationship with each processing circuit is determined in units of input cells, when the process contents for a cell are to be changed, or a processing circuit is to be added or omitted, many settings must be changed. For this reason, the conventional cell selection circuit cannot quickly deal with changes in service request.

SUMMARY OF THE INVENTION

It is an object of the present invention to provide a cell selection apparatus which can allocate the same processing circuit, with a small initial setting amount, to cells associated with each other which are to be processed by the same processing circuit.

In order to achieve the above object, according to the present invention, there is provided a cell selection apparatus comprising a plurality of processing circuits for performing predetermined processes for cells to which identifiers for identifying transfer routes in an asynchronous transfer mode communication system are added, not less than one of the processing circuits being provided for each of a plurality of types of processes, first storage means for storing, in correspondence with each cell identifier, a cell identifier indicating a group to which a cell belongs, and a process identifier indicating a process to be performed for the group, second storage means for storing, in correspondence with each cell identifier, a circuit identifier indicating a processing circuit for a cell which is designated by a group, and discrimination information indicating whether the circuit identifier is valid, read means for reading out a corresponding cell identifier and a corresponding process identifier from the first storage means on the basis of an identifier added to each cell, discrimination means for referring to the second storage means to discriminate on the basis of the discrimination information whether a circuit identifier corresponding to a cell identifier read out by the read means is valid, selection means for, when the discrimination means discriminates that the circuit identifier is not valid, selecting one of the processing circuits which corresponds to a process type indicated by the process identifier read by the read means, registration means for registering, in the second storage means, discrimination information indicating that the circuit identifier indicating the processing circuit selected by the selection means is valid, and switching means for inputting the cell to the processing circuit selected by the selection means, and inputting the cell to the processing circuit indicated by the circuit identifier discriminated as a valid identifier by the discrimination means.

BRIEF DESCRIPTION OF THE DRAWINGS

FIG. 1 is a block diagram showing the schematic arrangement of a cell selection circuit according to an embodiment of the present invention;

FIG. 2 is a view showing an example of the registered contents of a conversion table in FIG. 1;

FIG. 3 is a view showing an example of the registered contents of a selector output reference table in FIG. 1;

FIG. 4 is a view showing an example of the registered contents of a selector output number table in FIG. 1;

FIG. 5 is a view showing an example of the registered contents of a pointer table in FIG. 1; and FIG. 6 is a flow chart showing the flow of processing to be performed when the cell selection circuit in FIG. 1 selects a processing circuit.

DESCRIPTION OF THE PREFERRED EMBODIMENT

An embodiment of the present invention will be described in detail below.

FIG. 1 shows the schematic arrangement of a cell selection circuit according to an embodiment of the present invention. This cell selection circuit includes a plurality of types of processing circuits. The cell selection circuit selects processing circuits of types corresponding to cells input from a plurality of input lines, and sends the cells to corresponding output lines after performing predetermined processes for the cells. The transferred cells are classified in units of groups which hold a telephone conference. A specific group to which a given cell belongs is identified in accordance with the VPI/VCI data added to the cell. Cells belonging to the same group are subjected to the same processing in the same processing circuit.

First and second input lines $11_1$ and $11_2$ are respectively connected to conversion circuits $12_1$ and $12_2$ as read means for obtaining cell identifiers representing groups to which cells are belong and process identifiers representing processes to be performed for the groups on the basis of the VPI/VCI data of the cells. The conversion circuits $12_1$ and $12_2$ respectively refer to conversion tables $13_1$ and $13_2$ (first storage means), in which the relationships between VPI/VCI data, cell identifiers, and process identifier are registered, to perform conversion processes. Outputs from the conversion circuits $12_1$ and $12_2$ are respectively input to selector output determination circuits $14_1$ and $14_2$ for selecting processing circuits to be allocated to cells on the basis of the cell identifiers and the process identifiers. A pointer table 15 (third storage means), a selector output number table 16 (second storage means), and a selector output reference table 17 (second storage means), which are used to select processing circuits, are connected to the selector output determination circuits $14_1$ and $14_2$. These tables will be described in detail below.

Each of the selector output determination circuits $14_1$ and $14_2$ includes a discrimination section 14a for referring to the selector output reference table 17 to discriminate whether a processing circuit selected on the basis of the cell identifier is valid, a selection section 14b for selecting one processing circuit corresponding to the process type by referring to the pointer table 15 when it is discriminated that the processing circuit selected in accordance with the cell identifier is not valid, and a registration section 14c for registering, in the selector output reference table 17, information indicating that the processing circuit selected by the selection section 14b is valid.

Selector circuits $18_1$ and $18_2$ as switching means for switching processing circuits to which cells are to be input are respectively connected to the selector output determination circuits $14_1$ and $14_2$. N processing circuits $19_1$ to $19_N$ are connected to each of the selector circuits $18_1$ and $18_2$. Each of the selector circuits $18_1$ and $18_2$ can input a cell to any one of the N processing circuits $19_1$ to $19_N$. Assume that there are five types of processes, and a plurality of processing circuits are provided for each type of process. For example, the three processing circuits $19_1$ to $19_3$ are prepared for a telephone conference. The two processing circuits $19_4$ and $19_5$ are prepared for speech compression.

Outputs from the processing circuits $19_1$ to $19_N$ are input to acquisition circuits $21_1$ and $21_2$. Each of the processing circuits $19_1$ to $19_N$ selects a specific acquisition circuit to which a processed cell is to be output in accordance with the VPI/VCI data of the cell. Each of the acquisition circuits $21_1$ and $21_2$ asynchronously performs time division multiplexing of cells sent from the processing circuits $19_1$ to $19_N$ and outputs the resultant data to a corresponding one of output lines $22_1$ and $22_2$.

FIG. 2 shows an example of the registered contents of each of the conversion tables $13_1$ and $13_2$ in FIG. 1. Each of the conversion tables $13_1$ and $13_2$ is a table in which the cell identifiers and process identifiers of cells are registered in correspondence with the values of VPI/VCI data added to the cells. The registered contents of this table are not changed unless the contents of processes to be performed for cells are changed or the cell groups are rearranged. In each of the conversion tables $13_1$ and $13_2$, cell identifiers 31 and process identifiers 32 are registered in pairs from the start portion. A predetermined number of bits of VPI/VCI data represents an offset amount 33 from the start portion of each of the conversion tables $13_1$ and $13_2$. That is, the VPI/VCI data is used as address information for accessing each of the conversion tables $13_1$ and $13_2$. By registering identical cell identifiers at a plurality of positions addressed by VPI/VCI data, it can be determined that the corresponding cells belong to the same group. Each process identifier represents the type of process to be performed for a corresponding cell. Since the same process is performed for cells belonging to the same group, cells whose cell identifiers are the same have the same process identifiers.

FIG. 3 shows an example of the registered contents of the selector output reference table 17. In the selector output reference table 17, selector output numbers 41 as the identification numbers of the processing circuits $19_1$ to $19_N$ to be allocated to cells in given groups, and validity bits 42 indicating whether the registered identification numbers are valid are registered in correspondence with the cell identifiers. This table is updated every time communication for a telephone conference is started or ended. The selector output reference table 17 contains the cell identifier 31 obtained from the conversion table $13_1$ or $13_2$ in FIG. 2 as address information representing an offset amount 43 from the start portion. If cell identifiers have the same value, since the same position in the selector output reference table 17 is referred to, the same processing circuit is selected for the cells having the identical cell identifiers. When the validity bit 42 is "1", it indicates the selector output number 41 is valid. When the validity bit 42 is "0", it indicates that the registered selector output number is invalid, and any of the processing circuits $19_1$ to $19_N$ has not been allocated to the group indicated by the cell identifier.

FIG. 4 shows an example of the registered contents of the selector output number table 16. The selector output number table 16 is a table in which the abilities of the processing circuits or the allocation order of the processing circuits is registered for each type of process. The selector output numbers as the identification numbers of the processing circuits are registered in the respective columns of the selector output number table 16. This table is divided into areas, from the start portion, in units of process types. The selector output numbers of processing circuits for performing processes for a telephone conference are registered in a first area 51 starting from the start portion of the table. The selector output numbers of processing circuits for performing processes for speech compression are registered in a second area 52 following the first area 51. One column of the selector output number table 16 corresponds to the processing ability of a circuit, of the processing circuits prepared for the corresponding process type, which has the minimum processing ability. For example, the first area 51 contains three types of selector output numbers, i.e., "1", "2", and "3", and hence three processing circuits are prepared for the telephone conference. As indicated by an area 53, since selector output number "2" is registered in this area only once in the first area 51, this number indicates the minimum ability of the processing abilities for the telephone conference.

If the processing circuit indicated by selector output number "1" has a processing ability three times higher that of the ability of the processing circuit indicated by selector output number "2" as the minimum ability, three columns are ensured for "1" in the first area 51. Similarly, if the processing circuit indicated by selector output number "3" has an ability twice higher than the minimum ability, two columns are ensured for "3". Six columns are ensured in the first area 51 as a whole. That is, the total ability of the three processing circuits for a telephone conference are six times higher than the minimum ability.

The second area 52, in which the data of the processing circuit for speech compression are registered, includes only one area 54 in which selector number "5" is registered. That is, the processing circuit indicted by selector output number "5" has the minimum ability in all the speech compression processing circuits. If the processing circuit indicated by selector output number "4" has an ability three times higher than the minimum ability, three columns are ensured for "4". A total of four columns are ensured in the second area 52. That is, the total ability of the two processing circuits is four times higher than the minimum ability.

FIG. 5 shows an example of the registered contents of the pointer table 15. The pointer table 15 is referred to when the validity bit 42 in the selector output reference table 17 in FIG. 3 is "0". In the pointer table 15, information used to search for a processing circuit to be allocated next for each process type is stored in advance. The process identifier 32 obtained by using the conversion table $13_1$ or $13_2$ in FIG. 2 represents address information indicating an offset amount 61 from the start portion. That is, one-row information corresponds to one process type. Assume that the process identifier 32 for a telephone conference is "0", and the process identifier 32 for speech compression is "1". In this case, in accordance with this address information, a first row 62 of the table 15 represents information about the telephone conference, and a second row 63 represents information about the speech compression.

In the pointer table 15, an offset column 64 indicates a specific amount by which the selector output number of a corresponding process in the selector output number table 16 in FIG. 14 is separated from the start portion of the selector output number table 16. For example, an offset amount 57 between the start portion of the selector output number table 16 in FIG. 4 and the second area 52 for the speech compression process is "6", this value "6" is registered as an offset amount in the row 63 corresponding to the speech compression process in FIG. 5. A pointer 65 indicates the ordinal number of a column, from the start column of the corresponding area in the selector output number table 16 in FIG. 14, in which the number of a processing circuit to be allocated next is registered. For example, in the row 62 for the telephone conference process, "3" is registered as a pointer value. This value indicates that the processing circuit indicated by selector output number "1" stored in an area 55 offset (incremented) from the start column of the first area 51 in the selector output number table 16 by three columns is allocated as the next processing circuit for the telephone conference.

A maximum value 66 corresponds to the size of an area ensured in the selector output number table 16. The maximum value 66 in the pointer table 15 is given by the following equation:

maximum value =

-continued $$\frac{\text{the number of processing circuits for the same process} \times}{\text{average processing ability of processing circuits for the same process}}$$
$$\frac{\text{minimum processing ability on processing circuits for the same process}}{}$$

That is, the maximum value represents the number of processing circuits which is normalized by the minimum processing ability in the processing circuits for the same service.

Every time a processing circuit corresponding to the minimum ability is allocated, the pointer value is incremented by "1". When the pointer value becomes equal to the maximum value, the pointer value returns to "0". With this operation, the pointer value loops in the area for each process in the selector output number table 16.

An operation to be performed when the cell selection circuit in FIG. 1 allocates the processing circuits $19_1$ to $19_N$ on the basis of these tables will be described below.

FIG. 6 shows the flow of processing to be performed when the cell selection circuit selects a processing circuit. When a cell is sent through the input line $11_1$, the conversion circuit $12_1$ refers to the conversion table $13_1$ to acquire a cell identifier and a process identifier on the basis of VPI/VCI data added to the cell (step S101). Assume that cell identifier "S1" and process identifier "P1" on the third row from the start portion of the conversion table $13_1$ in FIG. 2 are read out on the basis of the VPI/VCI data. Assume also that the numerical portion of each identifier corresponds to an offset amount from the start portion of each table. The values of these identifiers and the cell are sent from the conversion circuit $12_1$ to the selector output determination circuit $14_1$.

The selector output determination circuit $14_1$ reads out the validity bit 42 by referring to the selector output reference table 17 using the sent cell identifier as address information (step S102). For example, since cell identifier "S1" previously read out from the conversion table $13_1$ indicates address "1", validity bit "0" stored in the second row from the start portion of the selector output reference table 17 in FIG. 3 is read out.

The discrimination section 14a of the selector output determination circuit $14_1$ discriminates whether the readout validity bit is "1" (step S103). If the validity bit is "1", since the selector output number is valid, the corresponding selector output number is read out from the selector output reference table 17 (step S104). If the validity bit is not "1", it indicates that no processing circuit is allocated. In this case, therefore, the selection section 14b of the selector output determination circuit $14_1$ refers to the pointer table 15 by using the process identifier sent from the conversion circuit $12_1$ as address information so as to read out pointer and offset values in the row corresponding to the process type (step S105). In the case of process identifier "P1" previously read out from the conversion table $13_1$, the second row 63 from the start portion of the pointer table 15 in FIG. 5 is referred to. Consequently, "0" and "6" are respectively read out as a pointer value and an offset value.

The selection section 14b of the selector output determination circuit $14_1$ reads out data from the selector output number table 16 by using, as address information, a value obtained by adding a pointer value to an offset value read out from the pointer table 15 (step S106). If the pointer value is "0" and the offset value is "6", selector output number "4" stored in an area 56 at address "6" is read out. The registration section 14c of the selector output determination circuit $14_1$ registers the readout selector output number in the selector output reference table 17. That is, the validity bit which has been "0" is set to "1" (step S107). With this operation, when a cell to which an identical cell identifier is assigned arrives afterward, since the validity bit is "1" in the selector output reference table 17, the processing circuit indicated by the registered selector output number is selected. When the selector output number is not registered in the selector output reference table 17, the registration section 14c of the selector output determination circuit $14_1$ registers the selector output number at the address indicated by the cell identifier, together with the validity bit.

Since one processing circuit has been allocated, the selector output determination circuit $14_1$ adds "1" to the pointer value to allocate the processing circuit registered next when a cell arrives from another group which performs the same processing (step S108). For example, since the pointer value read out from the pointer table 15 is "0", this value is updated to "1". If the value to which "1" is added becomes equal to the maximum value 66 registered in the column of the pointer table 15 which corresponds to the some process, the value of the pointer 65 is reset to "0". With this operation, the pointer value loops within the allocated area.

The selector circuit $18_1$ switches cell transfer routes to connect the cell to one of the processing circuits $19_1$ to $19_N$ which is represented by the selector output number acquired in this manner. The cell identifier and the input cell are input to the processing circuit (step S109). After the cell is processed by the selected processing circuit, the resultant data are grouped into one data for one output line by each of the acquisition circuits $21_1$ and $21_2$ to be output.

Since none of the processing circuits $19_1$ to $19_N$ has been allocated to the first input cell when communication was started, allocation of a processing circuit is determined, and the selection result is registered in the selector output reference table 17. The second or subsequent cell belonging to the same group is input to the processing circuit registered in the selector output reference table 17. With this operation, cells belonging to the same group can be sent to the same processing circuit. In addition, since allocation of a processing circuit needs to be performed for only the first cell, the processing speed can be increased. When the cell allocation process is to be changed, only the registered data of the conversion tables $13_1$ and $13_2$ need to be changed, but the remaining tables are not influenced. When the ability of a given processing circuit is changed, only the data of the selector output number table 16 and the pointer table 15 need to be changed. In this manner, this apparatus can relatively easily cope with a change in service request or addition/omission of a processing circuit.

In the selector output number table 16, the registration order of processing circuit numbers is set such that identical numbers do not continue but scatter as much as possible. If the registration order is set in this manner, the loads on the respective processing circuits can be dispersed by only allocating the processing circuits in accordance with the registration order.

The above embodiment includes the two input lines and the two output lines for the sake of descriptive convenience. However, the number of input and output lines can be arbitrarily set. In addition, there are five types of processing circuits in the above embodiment. As is apparent, however, the number of types of processing circuits may be arbitrarily set.

As has been described above, according to the present invention, cell identifiers are related to groups to which cells belong, and the types of processes to be performed by the groups, and the processing circuits are allocated in accordance with the types of processes of the respective groups. In addition, the identifiers of the processing circuits allocated in units of groups are stored. Therefore, even if processing circuits are not registered to be directly related to cell identifiers, cells belonging to the same group can be processed by the same processing circuit. In addition, this apparatus can quickly and easily cope with a change in the contents of a process performed for a cell, a change in service request such as addition or omission of a processing circuit.

In addition, since the processing abilities of the respective processing circuits are normalized and managed with the unit processing ability, the processing circuits can be allocated to processes for cells in accordance with frequencies corresponding to the processing abilities of the respective processing circuits.

Furthermore, since circuit identifiers corresponding in number to the processing abilities of the processing circuits are registered in the respective storage areas, the processing circuits can be allocated at ratios corresponding to the processing abilities of the processing circuit by sequentially reading out data from the storage areas. This apparatus can easily cope with addition/omission of a processing circuit or a change in processing ability.

Moreover, since the processing circuits and allocation circuit information storage means are commonly provided for cells input through two or more lines, cells belonging to the same group can be processed by the same processing circuit regardless of lines through which the cells are input.

What is claimed is:

1. A cell selection apparatus comprising:

a plurality of processing circuits for performing predetermined processes for cells to which identifiers for identifying transfer routes in an asynchronous transfer mode communication system are added, not less than one of said processing circuits being provided for each of a plurality of types of processes;

first storage means for storing, in correspondence with each cell identifier, a cell identifier indicating a group to which a cell belongs, and a process identifier indicating a process to be performed for the group;

second storage means for storing, in correspondence with each cell identifier, a circuit identifier indicating a processing circuit for a cell which is designated by a group, and discrimination information indicating whether the circuit identifier is valid;

read means for reading out a corresponding cell identifier and a corresponding process identifier from said first storage means on the basis of an identifier added to each cell;

discrimination means for referring to said second storage means to discriminate on the basis of the discrimination information whether a circuit identifier corresponding to a cell identifier read out by said read means is valid;

selection means for, when said discrimination means discriminates that the circuit identifier is not valid, selecting one of said processing circuits which corresponds to a process type indicated by the process identifier read by said read means;

registration means for registering, in said second storage means, discrimination information indicating that the circuit identifier indicating said processing circuit selected by said selection means is valid; and switching means for inputting the cell to said processing circuit selected by said selection means, and inputting the cell to said processing circuit indicated by the circuit identifier discriminated as a valid identifier by said discrimination means.

2. An apparatus according to claim 1, further comprising third storage means for storing a normalized processing ability indicating an ability ratio with respect to a unit processing ability of said processing circuit for each process type, and wherein said processing circuit has a processing ability an integer times higher than the unit processing ability as a reference for each process type, and said selection means selects one of said processing circuits in accordance with the normalized processing ability of said processing circuit which is stored in said third storage means.

3. An apparatus according to claim 2, wherein the process identifier read out from said first storage means by said read means is used as address information of said third storage means.

4. An apparatus according to claim 2, further comprising fourth storage means having an area in which circuit identifiers indicating said processing circuits corresponding in number to the normalized processing abilities of said processing circuit are registered in units of process types, and wherein said selection means cyclically reads out data from said fourth storage means which corresponds to a process type indicated by the process identifier read out by said read means, and selects a next processing circuit.

5. An apparatus according to claim 4, wherein said third storage means stores start address information and pointer information indicating an area in which a circuit identifier indicating said next processing circuit is registered in units of process types, the pointer information in said third storage means is reset after the pointer information is sequentially incremented up to the normalized processing ability every time said processing circuit is selected by said selection means, and said fourth storage means is accessed in accordance with the start address information and the pointer information in said third storage means.

6. An apparatus according to claim 1, further comprising a plurality of communication lines to which the cells are input, and wherein said processing circuit and said second storage means are commonly used for cells sent through said plurality of communication lines.

7. An apparatus according to claim 1, wherein said registration means registers a circuit identifier indicating a selected processing circuit, together with discrimination information, when the circuit identifier indicating said processing circuit selected by said selection means is not registered in said second storage means.

8. An apparatus according to claim 1, wherein said read means reads out a cell identifier and a process identifier from said first storage means in accordance with an identifier of an input cell as address information.

9. An apparatus according to claim 1, wherein a cell identifier read out from said first storage means by said read means is used as address information for said second storage means.

* * * * *